United States Patent
Wakeford et al.

(10) Patent No.: US 10,159,903 B1
(45) Date of Patent: *Dec. 25, 2018

(54) SYSTEM AND METHOD FOR ENHANCED VIDEO OF GAME PLAYBACK

(71) Applicant: Electronic Arts Inc., Redwood City, CA (US)

(72) Inventors: Kent Wakeford, Hillsborough, CA (US); Clifford J. Harrington, San Francisco, CA (US)

(73) Assignee: Electronics Arts Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/688,670

(22) Filed: Aug. 28, 2017

Related U.S. Application Data

(63) Continuation of application No. 15/335,119, filed on Oct. 26, 2016, now Pat. No. 9,744,467, which is a (Continued)

(51) Int. Cl.

| | | |
|---|---|---|
| *A63F 13/30* | (2014.01) | |
| *A63F 13/86* | (2014.01) | |
| *A63F 13/52* | (2014.01) | |
| *A63F 13/525* | (2014.01) | |
| *A63F 13/53* | (2014.01) | |
| *A63F 13/497* | (2014.01) | |
| *A63F 13/60* | (2014.01) | |

(52) U.S. Cl.
CPC ............ *A63F 13/86* (2014.09); *A63F 13/497* (2014.09); *A63F 13/52* (2014.09); *A63F 13/525* (2014.09); *A63F 13/53* (2014.09); *A63F 13/60* (2014.09)

(58) Field of Classification Search
CPC ....................................................... A63F 13/30
See application file for complete search history.

(56) References Cited

U.S. PATENT DOCUMENTS

| 6,699,127 B1 | 3/2004 | Lobb |
|---|---|---|
| 8,526,490 B2 | 9/2013 | Perlman |

(Continued)

FOREIGN PATENT DOCUMENTS

| WO | 2014179392 | 1/2014 |
|---|---|---|

OTHER PUBLICATIONS

PCT International Preliminary Report on Patentability issued in PCT/US2014/036021 dated Nov. 12, 2015, 7 pages.

*Primary Examiner* — Omkar Deodhar
(74) *Attorney, Agent, or Firm* — Knobbe, Martens, Olson & Bear, LLP

(57) ABSTRACT

One aspect of the disclosure relates to facilitating the development and provision of enhanced video of game playback, including the ability to augment a video of game playback with information relating to the game state of the game. A video may be generated based on game state information associated with one or more selected portions of the game. The video may include visual features that may not have been present in corresponding views that were presented to the user during game play of those one or more portions of the game. The user may augment the video with displayed information based on game logic for the online game. For example, displayed information may include commentary, tips on how the user could have maximized his game play, influential plays from the one or more portions of the game, and/or other information based on the game logic.

19 Claims, 3 Drawing Sheets

Related U.S. Application Data continuation of application No. 14/678,904, filed on Apr. 3, 2015, now Pat. No. 9,492,757, which is a continuation of application No. 13/873,584, filed on Apr. 30, 2013, now Pat. No. 8,998,725.

(56) References Cited

U.S. PATENT DOCUMENTS

| | | |
|---|---|---|
| 8,622,839 B1 | 1/2014 | McKenzie |
| 8,998,725 B2 | 4/2015 | Wakeford |
| 2004/0087363 A1 | 5/2004 | Bogenn |
| 2007/0173324 A1 | 7/2007 | Multerer |
| 2007/0297755 A1 | 12/2007 | Holt |
| 2009/0286604 A1 | 11/2009 | Clowes |
| 2010/0166068 A1 | 7/2010 | Perlman |
| 2010/0240459 A1 | 9/2010 | Shelton |
| 2010/0312820 A1 | 12/2010 | Goffinet |
| 2011/0105226 A1 | 5/2011 | Perlman |
| 2011/0107220 A1 | 5/2011 | Perlman |
| 2011/0151971 A1 | 6/2011 | Altshuler |
| 2012/0040754 A1 | 2/2012 | Dutilly |
| 2012/0100910 A1 | 4/2012 | Eichorn |

SYSTEM AND METHOD FOR ENHANCED VIDEO OF GAME PLAYBACK

FIELD

The disclosure relates to facilitating the development and provision of enhanced video of game playback, including the ability to augment a video of game playback with information relating to the game state of the game.

BACKGROUND

Various techniques for providing video of game playback are known. For example, conventional systems may facilitate the development of "brag clips" in which a user may change the camera viewpoint of the game being recorded based on a replayed game state sequence. Further, the "brag clip" may have a vantage of a camera that may "fly through" the game segment. The "brag clip" may also be augmented with audio from the user, with $3^{rd}$ party commentary, and with text comments. The "brag clip" may also be exportable to external video sharing sites. Other examples include facilitating user tagging of events that occur during gameplay to include in a video of a gameplay sequence, in which events may be viewed from various camera angles and/or player viewpoints, may be time-scaled (e.g., slowed down or sped up), or may be colored.

Conventional systems, however, suffer from various drawbacks and inefficiencies relating to enhancing video of game playback. For example, conventional systems may fail to facilitate the augmentation of a video of game play with information based on the game logic of the game.

SUMMARY

One aspect of the disclosure relates to facilitating the development and provision of enhanced video of game playback, including the ability to augment a video of game playback with information relating to the game state of the game. A user may generate a video of a portion of the game. For example, the user may select one or more portions of the game to include in a video. The video may be generated based on game state information associated with those one or more portions. As such, the video may include visual features that may not have been present in corresponding views that were presented to the user during game play of those one or more portions of the game. The user may then augment the video with additional displayed information. For example, the user may augment the video with commentary, with tips on how the user could have maximized his game play, influential plays from the one or more portions of the game, and/or other displayed information relating to the one or more portions of the game included in the video.

A system configured to facilitate enhancement of video of game playback for an online game may include a game state repository, a game logic repository, one or more processors configured to execute compute program modules, and/or other components. The program modules may comprise a space module, a video development module, a video enhancement module, and/or other modules.

A game state repository may be configured to store state information representing a game state of an online game over time. Among other information, the state information may include information related to a first set of one or more virtual entities in the online game associated with a first user. For example, state information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

A game logic repository may be configured to store game logic for the online game. Game logic may comprise, for example, information related to one or more actions to occur in the online game in association with one or more interactions with one or more users.

A space module may be configured to execute an instance of a virtual space. The space module may also be configured to implement the instance of the virtual space to facilitate participation by the one or more users in the online game within the virtual space by determining view information from the instance and transmitting the view information to one or more client computing platforms associated with the one or more users that facilitate presentation of views of the virtual space to the one or more users by the one or more client computing platforms.

A video development module may be configured to generate a video that depicts at least a portion of the online game. For example, the video development module may be configured to generate the video based on information from the game state repository related to the portion of the online game.

A video enhancement module may be configured to facilitate augmentation of the video with displayed information. The displayed information may be based on the game logic for the online game. The video may comprise one or more clips from the online game, where an individual clip may comprise one or more successively presented views of the online game.

In some implementations, a method of facilitating enhancement of video of game playback for an online game may comprise: storing, at a game state repository on the client computing device, a game state of a game space in which the online game takes place, the game state including information related to a first set of one or more virtual entities in the game space associated with a first user; storing, at a game logic repository on the client computing device, game logic for the online game, the game logic comprising information related to one or more actions to occur in the online game in association with one or more interactions with one or more users, the one or more users comprising the first user; generating a video that depicts at least a portion of the online game based on information from the game state repository; and facilitating augmentation of the video with displayed information, the displayed information being based on the game logic for the online game, wherein the video comprises one or more clips from the online game, a clip comprising one or more successively presented views of the online game In some implementations, a non-transitory electronic storage media may store information related to facilitating enhancement of video of game playback for an online game. The stored information may comprise: a memory configured to store information related to one or more players of the online game; a game state repository configured to store a game state of a game space in which the online game takes place, the game state including information related to a first set of one or more virtual entities in the game space associated with a first user; and a game logic repository configured to store game logic for the online game, the game logic comprising information related to one or more actions to occur in the online game in association with one or more interactions with one or more users, the one or more users comprising the first user. The non-transitory electronic storage media may also comprise instructions configured to cause a client computing platform to: generate a video that depicts at least a portion of the online game based on information from the game state repository; and facilitate augmentation of the video with displayed information, the displayed information being based on the game logic for the online game, wherein the video comprises one or more clips from the online game, a clip comprising one or more successively presented views of the online game.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
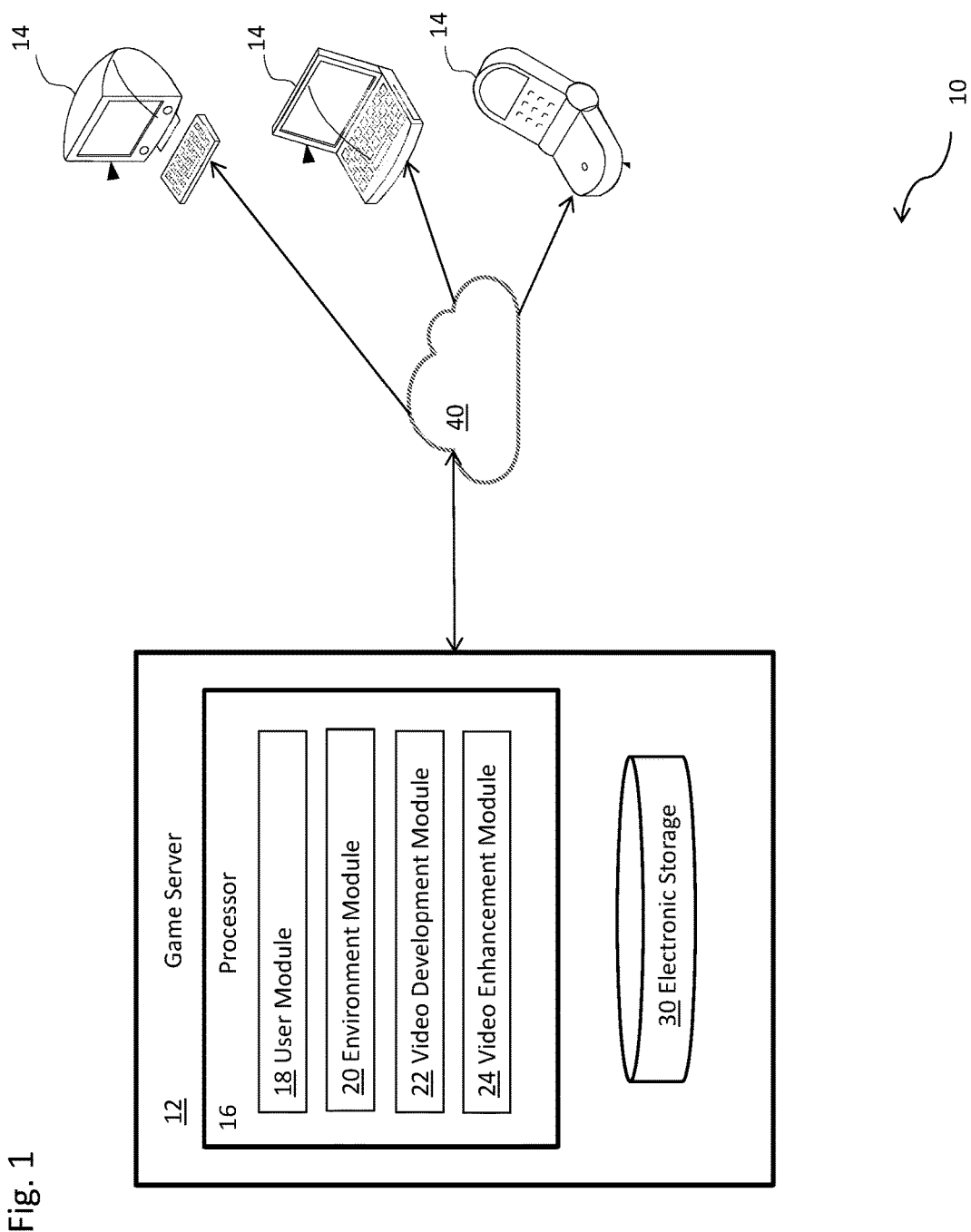
FIG. 1 illustrates an exemplary system configured to facilitate enhancement of a video of game playback for an online game, according to an aspect of the invention.

FIG. 1 illustrates a system 10 configured to facilitate enhancement of a video of game playback for an online game. In some implementations, system 10 may include a game server 12. The game server 12 may host a game space in which an online game takes place. The game server 12 may be configured to communicate with one or more client computing platforms 14 according to a client/server architecture. The users may access system 10 and/or the virtual space via client computing platforms 14.

The game server 12 may comprise electronic storage 30 including a game state repository and a game logic repository.

The game state repository of the electronic storage 30 may be configured to store state information representing a game state of an online game over time. Among other information, the state information may include information related to a first set of one or more virtual entities in the online game associated with a first user. For example, state information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

The game logic repository of the electronic storage 30 may be configured to store game logic for the online game. Game logic may comprise, for example, information related to one or more actions to occur in the online game in association with one or more interactions with one or more users. In some implementations, the information of the game logic may include relationships between one or more actions. For example, the game logic may include a plurality of if-then relationships between actions to occur in the game in association with interactions with one or more users. In some implementations, the information of the game logic may be depicted via a hierarchical tree structure that includes information relating to a plurality of potential actions that may occur based on potential interactions of users with the game. The game server 12 may use the game logic of the game, for example, to determine an action to take in a game, to determine potential actions that could occur in the game, to determine whether an action (or interaction by a user) is influential in an outcome of a game, and/or to determine other information related to the game.

The game server 12 may be configured to execute one or more computer program modules. The computer program modules may include one or more of a user module 18, a space module 20, a video development module 22, a video enhancement module 24, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

Space module 20 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 20. Expressions of the instance executed on the clients may include space logic that effectively provides for execution of a limited version of the instance on a client that is synchronized and/or verified with state information received from space module 20. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 20 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via respective client computing platforms 14. Communications may be routed to and from the appropriate users through game server 12 (e.g., through space module 20).

Video development module 22 of the game server 12 may be configured to generate a video that depicts at least a portion of the online game. For example, video development module 22 may be configured to generate a video based on information from the game state repository. The generated video may comprise one or more clips from the online game, where an individual clip may comprise one or more successively presented views of the online game.

In some implementations, the generated video may comprise visual features that were not present in corresponding views of the game presented to the user during game play. For example, one or more clips of the video may be generated based on information from the game state repository. Because the clips are generated based on information from the game state repository, those clips of the video may comprise additional visual features compared to the corresponding views presented during game play. The visual features may comprise, for example, 3-dimensional assets, commentary associated from the user, commentary from third parties, one or more inputs received from the user during game play, one or more inputs received from another user during game play, a view from a perspective of the user, a view from another perspective, a "fly-through" of the view, and/or other features. In some implementations, the video may comprise views that were presented to the user during game play.

In some implementations, the video development module 22 may facilitate manipulation of one or more clips of the video. For example, manipulation of an individual clip may comprise coloration, shading, addition of texture, slowing down of activity occurring during the clip, speeding up of activity occurring during the clip, abridgement of the clip, and/or other manipulation.

The video development module 22 may facilitate selection of visual features and/or manipulation for each individual clip of the one or more clips of the video. For example, the video may include one or more clips that comprise views corresponding that were presented to the user during game play and one or more clips that comprise views generated based on information from the game state repository.

Figure 2B:
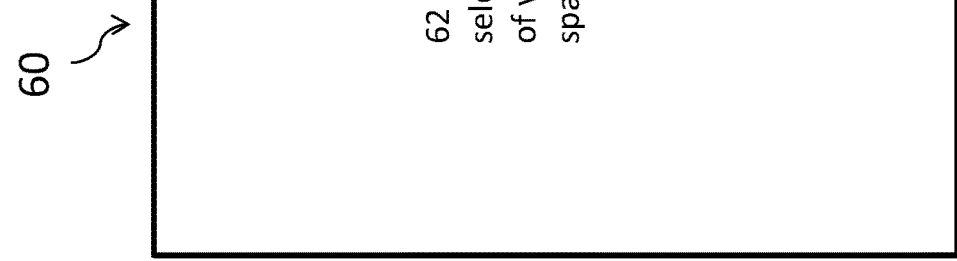
FIG. 2B illustrates an exemplary depiction of a clip generated by the system, where the clip corresponds to the view of FIG. 2A, according to an aspect of the invention.
Figure 2A:
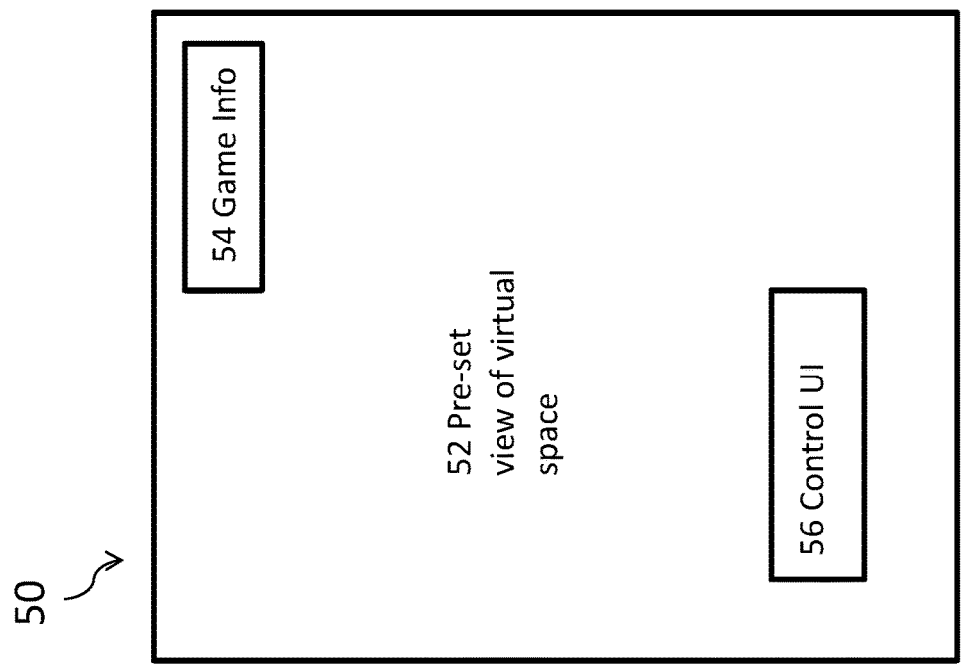
FIG. 2A illustrates an exemplary depiction of a view presented to a user during an online game, according to an aspect of the invention.

For example, FIG. 2A illustrates an exemplary depiction of a view 50 presented to a user during an online game, according to an aspect of the invention. FIG. 2B illustrates an exemplary depiction of a clip 60 generated by the system, where the clip corresponds to the view depicted in FIG. 2A, according to an aspect of the invention.

As shown in FIG. 2A, an exemplary view 50 that may be presented to a user during game play of the online game may comprise, for example, a pre-set view of the instance of the virtual space of the online game 52 that depict the user's game at that moment. The pre-set view 52 may be a view to be presented to the user that is determined by the system and/or the online game. For example, the pre-set view may be a heads-up view, and/or other view from the perspective of the user. The pre-set view 52 may encompass an entire screen of the view 50, may encompass a majority of a screen, such that one or both of a header or footer are viewable in the screen, and/or may encompass another portion of the view screen 50.

The view 50 may also comprise game information 54, a control user interface 56, and/or other displayed elements. The game information 54 may comprise, for example, a time of play during the game, a current level of the game, information relating to the user within the game (e.g., a power level of the user, available skills of the user, available virtual assets of the user, available number of lives of the user, whether it is the user's turn in a turn-based game, a time until the user may take a next action, etc.), information relating to the game (e.g., a name of a world that the user currently inhabits, information identifying the game, etc.), and/or other information related to the game. The control user interface 56 may comprise one or more interactive components configured to facilitate receipt of information from the user. The control user interface 56 may display one or more available actions to the user and may facilitate receipt of information from the user related to the one or more available actions. The one or more available actions may change based on the user's progression through the online game. The game information 54, user control interface 56, and/or other elements may be disposed in a header, a footer, and/or other placement of the view 50. In another example, the game information 54, user control interface 56, and/or other elements may be overlaid the pre-set view 52.

FIG. 2B illustrates an exemplary depiction of a clip 60 generated by the video development module 22, according to an aspect of the invention. As shown in FIG. 2B, a user-selected view 62 of the virtual space corresponding to the view 50 may be displayed. This user-selected view 62 may comprise visual features the same or similar to those discussed with the generated video of the video development module 22. For example, the user-selected view 62 may not automatically comprise game information and/or a control user interface, as shown with the view 50 of FIG. 2B that is presented during game play of the online game.

Returning to FIG. 1, video enhancement module 24 of the game server 12 may be configured to facilitate augmentation of the video generated by video development module 22. For example, video enhancement module 24 may be configured to augment the video with additional displayed information. The displayed information may be based on the game logic for the online game. In some implementations, the displayed information may also be based on game state information as well.

The video enhancement module 24 may be configured to facilitate augmentation of the video by the user. For example, the video enhancement module 24 may present a user interface via which a user may augment the video with additional displayed information. In some implementations, the video enhancement module 24 may be configured to facilitate selection, by the user, of individual clips, a group of clips, individual views of a single clip, individual views from multiple clips, and/or any other grouping of views from the video. The video enhancement module 24 may be configured to facilitate augmentation of the selected grouping of views with additional information. In some implementations, the video enhancement module 24 may present one or more predetermined options of displayed information (and/or types of displayed information) by which the user may augment the video. In some implementations, the video enhancement module 24 may allow the user to input information related to displayed information with which the user would like to augment the video.

The displayed information available to the user may be determined, for example, on the game logic of the game. For example, the displayed information may comprise user input received from one or more users associated with the selected views. The user input may be obtained, for example, from the game state repository.

In another example, the displayed information may comprise one or more tips for game play during the game as presented by the selected views. The tips may be determined, for example, based on the game logic of the game. The tips may comprise, for example, one or more optimal moves to make during the selected views of the game, most popular moves made during the selected views of the game, most highly rated moves made during the selected views of the game, and/or other moves to make during the selected views of the game.

In another example, the displayed information may comprise an indication of the most influential clips of the video. For example, the video enhancement module 24 may be configured to determine, based on the game logic of the game, one or more clips depicting game play in the game that influence the outcome of the game. The one or more clips may comprise one or more moves by a user during game play that had an influence on the outcome of the game. The clips may comprise, for example, a single most influential move, a top percentage of influential moves, a predetermined number of the most influential moves, and/or other groupings of influential moves. The indication may comprise, for example, an audio indication, a visual indication (e.g., an icon, text, and/or other visual indication), and/or other type of indication that a clip comprises an influential move. In some implementations, the video enhancement module 24 may augment the video with user input related to the one or more influential moves. For example, the user input may be displayed with an indication that it was influential. The indication may be of a type same or similar to the indication of an influential clip, or may be a different type of indication.

In some implementations, the displayed information may comprise textual and/or graphic representation of game state information as well, based on the game state of the online game corresponding to an augmented clip. For example, when the displayed information comprises information relating to individual inputs by users, the displayed information could also comprise an indication of times in the clip at which the inputs were originally received. In another example, the displayed information may comprise information reflecting and/or noting a change in one or more ambient conditions. The examples of, and bases for, displayed information are not limited to those described herein.

The video enhancement module 24 may be configured to allow the displayed information augmenting the video to be displayed in conjunction with the display of the video. In some implementations, the video enhancement module 24 may be configured to display the display information by one or more of: one or more popups that occur during the video, a split screen display wherein a first side of a screen displays the displayed information and a second side of a screen displays the video, an overlay of the displayed information on the video, a display of the video and then a display of the displayed information, and/or by other display type. The video enhancement module 24 may facilitate receipt of display type information from the user, where the display type information comprises information indicating a display type for displayed information for a clip of the video. The video enhancement module 24 may facilitate receipt of display type information from the user for displayed information for each clip of the video that is augmented. In some implementations, more than one display type may be used with a clip. For example, the video enhancement module 24 may facilitate receipt of display type information for displayed information corresponding to respective views of a clip that are displayed.

In some implementations, the video enhancement module 24 may facilitate augmentation of the video by multiple users. In some implementations, the video enhancement module 24 may facilitate different levels of augmentation for a user based on the involvement of the user with the video. For example, responsive to a determination that a user participated in game play of corresponding views of any portion of the video, the video enhancement module 24 may allow the user to augment the video in any available way (e.g., with no restrictions). Responsive to a determination that a user is associated with a player user that participated in game play of corresponding views of any portion of the video, the video enhancement module 24 may determine whether the user has been indicated by the playing user as having permission to augment the video. Based on any indications of permission, the video enhancement module 24 may allow the user to augment the video. Responsive to a determination that a user is merely viewing a video, the video enhancement module 24 may allow the user to augment the video with commentary regarding the video.

In some implementations, one or more users who participated in game play of corresponding views of any portion of the video, a game administrator, and/or other users with unrestricted permission to augment the video may determine the level of permissions of augmentation allowed to different types of users (e.g., users granted permissions, users who merely view the video, and/or other types of users).

The video enhancement module 24 may facilitate distribution of an augmented video. For example, the video enhancement module 24 may facilitate the sharing of the augmented video via social media, emailing of the video, inclusion of information (e.g., text, a link, the video itself, etc.) related to the video in a game profile of a user associated with the video, the exportation of the video to an external video sharing site, and/or other distribution of the video. In some implementations, only a user that participated in game play depicted in the video may distribute the augmented video. In some implementations, the video enhancement module 24 may allow a user to distribute the augmented video based on permissions associated with the user (as discussed above).

The game server 12, client computing platforms 14, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources may be operatively linked via some other communication media.

Game server 12 may include electronic storage 30, one or more processors 16, and/or other components. Game server 12 may include communication lines, or ports to enable the exchange of information with a network 40 and/or other computing platforms 14. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 30 may comprise non-transitory storage media that electronically stores information. The electronic storage media of electronic storage 30 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 30 may include one or more virtual storage resources (e.g., cloud storage, a virtual private network, and/or other virtual storage resources). Electronic storage 30 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, and 24. Processor 16 may be configured to execute modules 18, 20, 22, and 24 by software; hardware; firmware; some combination of software, hardware, and/or firmware; and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, and 24 are illustrated in FIG. 1 as being implemented within a single processing unit, in implementations in which processor includes multiple processing units, one or more of modules 18, 20, 22, and 24 may be implemented remotely from the other modules. The description of the functionality provided by the different modules 18, 20, 22, and 24 described below is for illustrative purposes, and is not intended to be limiting, as any of modules 18, 20, 22, and 24 may provide more or less functionality than is described. For example, one or more of modules 18, 20, 22, and 24 may be eliminated, and some or all of its functionality may be provided by other ones of modules 18, 20, 22, and 24. As another example, processor 16 may be configured to execute one or more additional modules that may perform some or all of the functionality attributed below to one of modules 18, 20, 22, and 24.

A given client computing platform 14 may include one or more processors configured to execute computer program modules. The computer program modules may be configured to enable an expert or user associated with the given client computing platform 14 to interface with system 10, game server 12, and/or external resources, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Figure 3:
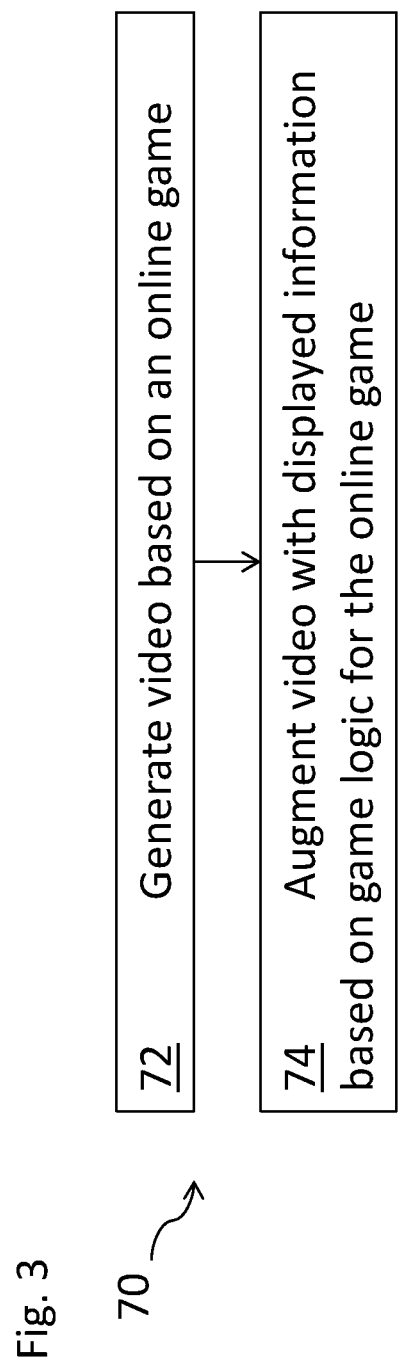
FIG. 3 illustrates an exemplary method of facilitating enhancement of a video of game playback for an online game, according to an aspect of the invention.

FIG. 3 illustrates a method 70 of providing a customized user experience based on a spend frequency of a user in an online game. The operations of method 70 presented below are intended to be illustrative. In some embodiments, method 70 may be accomplished with one or more additional operations not described, and/or without one or more of the operations discussed. Additionally, the order in which the operations of method 70 are illustrated in FIG. 3 and described below is not intended to be limiting.

In some embodiments, method 70 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 70 in response to instructions stored electronically on an electronic storage medium. The one or more processing devices may include one or more devices configured through hardware, firmware, and/or software to be specifically designed for execution of one or more of the operations of method 70.

At an operation 72, a video may be generated based on the online game. In some implementations, operation 72 may be performed by a video development module the same as or similar to video development module 22 (shown in FIG. 1 and described above).

At an operation 74, the video may be augmented with displayed information based on game logic for the online game. In some implementations, operation 74 may be performed by a video enhancement module the same as or similar to video enhancement module 24 (shown in FIG. 1 and described above).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate enhancement of video for an online game, the system comprising:

a game state repository configured to store state information representing a game state of an online game, the game state including information related to a first set of one or more virtual entities in the online game associated with a first user in which the user is participating in the online game;

a game logic repository configured to store game logic for the online game, wherein the game state is adjusted based on the game logic, the game logic comprising information related to one or more actions to occur in the online game in association with one or more interactions of one or more users with the online game, the one or more users comprising the first user; and one or more processors configured by machine-readable instructions to:

determine an outcome of the online game for the first user based on information from the game logic repository, the information from the game logic repository including one or more interactions of the first user with the online game, wherein the outcome is stored to the game state repository and included in the state information;

effectuate presentation of the state information including the outcome of the online game; and generate a video comprising the outcome and an animation that depicts the first set of one or more virtual entities in the online game and additional information related to the first set of one or more virtual entities besides the outcome, wherein the additional information is based on the state information from the game state repository; and effectuate presentation of the video subsequent to effectuating presentation of the state information.

2. The system of claim 1, wherein the video comprises visual features not present in views presented to the first user during game play of the online game.

3. The system of claim 1, wherein the game state repository is configured to store user input received from the first user during game play of the online game, and wherein the one or more processors are further configured by machine-readable instructions to facilitate augmentation of the video with the stored user input received from the first user, wherein the stored user input is associated with the first set of one or more virtual entities.

4. The system of claim 1, wherein the one or more processors are further configured by machine-readable instructions to facilitate augmentation of the video with displayed information, the displayed information being based on the game logic for the online game.

5. The system of claim 1, wherein the one or more processors are further configured by machine-readable instructions to determine, based on the game logic, the animation depicting game play by the first user in the online game that influence the outcome of the online game.

6. The system of claim 4, wherein the displayed information comprises a description of the animation that influences the outcome of the online game.

7. The system of claim 4, wherein the displayed information comprises information related to user input received from the first user during the game play depicted in the animation influence the outcome of the online game.

8. The system of claim 4, wherein the one or more processors are further configured by machine-readable instructions to display the display information by one or more of: one or more popups that occur during the video, or a split screen display wherein a first side of a screen displays the displayed information and a second side of a screen displays the video.

9. The system of claim 1, wherein the one or more processors are further configured by machine-readable instructions to generate the animation to include in the video separately from the views presented to the first user during game play of the online game.

10. A computer-implemented method of facilitating enhancement of video for an online game, the method being implemented in a computer system comprising one or more physical processors, the method comprising:
storing, at a game state repository on the client computing device, game state information representing a game state of the online game, the game state including information related to a first set of one or more virtual entities in the game space associated with a first user;
storing, at a game logic repository on the client computing device, game logic for the online game, the game logic comprising information related to one or more actions to occur in the online game in association with one or more interactions of one or more users with the online game, the one or more users comprising the first user;
determining an outcome of the online game for the first user based on information from the game logic repository, the information from the game logic repository including one or more interactions of the first user with the online game, wherein the outcome is stored to the game state repository and included in the state information;
effectuating presentation of the state information including the outcome of the online game; and
generating a video comprising the outcome and an animation that depicts the first set of one or more virtual entities in the online game and additional information related to the first set of one or more virtual entities besides the outcome, wherein the additional information is based on the state information from the game state repository; and
effectuating presentation of the video subsequent to effectuating presentation of the state information.

11. The method of claim 10, wherein the video comprises visual features not present in views presented to the first user during game play of the online game.

12. The method of claim 10, further comprising:
storing, at the game state repository, user input received from the first user during game play of the online game, and
facilitating augmentation of the video with the stored user input received from the first user, wherein the stored user input is associated with the first set of one or more virtual entities.

13. The method of claim 10, further comprising facilitating augmentation of the video with displayed information, the displayed information being based on the game logic for the online game.

14. The method of claim 10, further comprising:
determining, based on the game logic, the animation depicting game play by the first user in the online game that influences the outcome of the online game.

15. The method of claim 13, wherein the displayed information comprises a description of the animation.

16. The method of claim 13, wherein the displayed information comprises information related to user input received from the first user during the game play depicted in the animation.

17. The method of claim 13, further comprising:
displaying the display information by one or more of: one or more popups that occur during the video, or a split screen display wherein a first side of a screen displays the displayed information and a second side of a screen displays the video.

18. The method of claim 10, further comprising:
generating the animation to include in the video separately from the views presented to the first user during game play of the online game.

19. A non-transitory electronic storage media storing information related to facilitating enhancement of video for an online game, the stored information comprising:
a memory configured to store information related to one or more players of the online game;
a game state repository configured to store state information representing a game state of a game space in which the online game takes place, the game state including information related to a first set of one or more virtual entities in the game space associated with a first user in which the user is participating in the online game, wherein state information is presented to users on client computing devices associated with users, and presenting the state information includes presenting a first set of one or more game visual features to represent the first set of one or more virtual entities;
a game logic repository configured to store game logic for the online game, the game logic comprising information related to one or more actions to occur in the online game in association with one or more interactions of one or more users with the online game, the one or more users comprising the first user; and
instructions configured to cause a client computing platform to:
determine an outcome of the online game for the first user based on information from the game logic repository, the information from the game logic repository including one or more interactions of the first user with the online game, wherein the outcome is stored to the game state repository and included in the state information;
effectuate presentation of the state information including the outcome of the online game; and
generate a video comprising the outcome and an animation that depicts the first set of one or more virtual entities in the online game and additional information related to the first set of one or more virtual entities besides the outcome, wherein the additional information is based on the state information from the game state repository
effectuate presentation of the video subsequent to effectuating presentation of the state information.

* * * * *